(12) United States Patent
A et al.

(10) Patent No.: US 12,166,749 B2
(45) Date of Patent: Dec. 10, 2024

(54) NETWORK MANAGEMENT SYSTEM FOR DIAL-OUT COMMUNICATION SESSIONS

(71) Applicant: Juniper Networks, Inc., Sunnyvale, CA (US)

(72) Inventors: Chandrasekhar A, Bengaluru (IN); Bhaskar T. Reddy, Bangalore (IN); Jayanthi R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 331 days.

(21) Appl. No.: 17/707,217

(22) Filed: Mar. 29, 2022

(65) Prior Publication Data

US 2023/0198975 A1    Jun. 22, 2023

(30) Foreign Application Priority Data

Dec. 20, 2021   (IN) .............................. 202141059289

(51) Int. Cl.
    *H04L 9/40*       (2022.01)
    *H04L 67/101*     (2022.01)

(52) U.S. Cl.
    CPC ........ *H04L 63/0823* (2013.01); *H04L 67/101* (2013.01)

(58) Field of Classification Search
    None
    See application file for complete search history.

(56) References Cited

U.S. PATENT DOCUMENTS

| | | | |
|---|---|---|---|
| 10,375,024 B2 | 8/2019 | Foxhoven et al. | |
| 10,581,829 B1* | 3/2020 | Don | H04L 65/403 |
| 2017/0230451 A1* | 8/2017 | Paramasivam | H04L 67/535 |
| 2018/0041497 A1* | 2/2018 | Morishita | H04L 67/146 |
| 2019/0327112 A1* | 10/2019 | Nandoori | H04L 43/16 |
| 2019/0394042 A1* | 12/2019 | Peddada | H04L 9/0894 |
| 2021/0344602 A1 | 11/2021 | Lewin et al. | |

OTHER PUBLICATIONS

Partial European Search Report for Application No. EP22172365.3, mailed on Oct. 26, 2022, 14 pages.
Extended European Search Report for Application No. EP22172365.3, mailed on Mar. 3, 2023, 14 pages.

* cited by examiner

*Primary Examiner* — Kaveh Abrishamkar
(74) *Attorney, Agent, or Firm* — Harrity & Harrity, LLP

(57) ABSTRACT

A system determines identification information associated with an endpoint device, which is associated with a tenant of the system, and the tenant. The system generates and sends, to the endpoint device, a certificate that includes the identification information. The system receives, from the endpoint device and as part of an attempt by the endpoint device to initiate a dial-out communication session with the system, the certificate. The system causes, based on the certificate, the dial-out communication session to be established and processes the certificate to determine the identification information. The system receives, from the endpoint device and via the dial-out communication session, one or more messages; modifies the one or more messages to include the identification information; and provides the one or more modified messages to facilitate provisioning of services or resources associated with the system to the endpoint device.

20 Claims, 14 Drawing Sheets

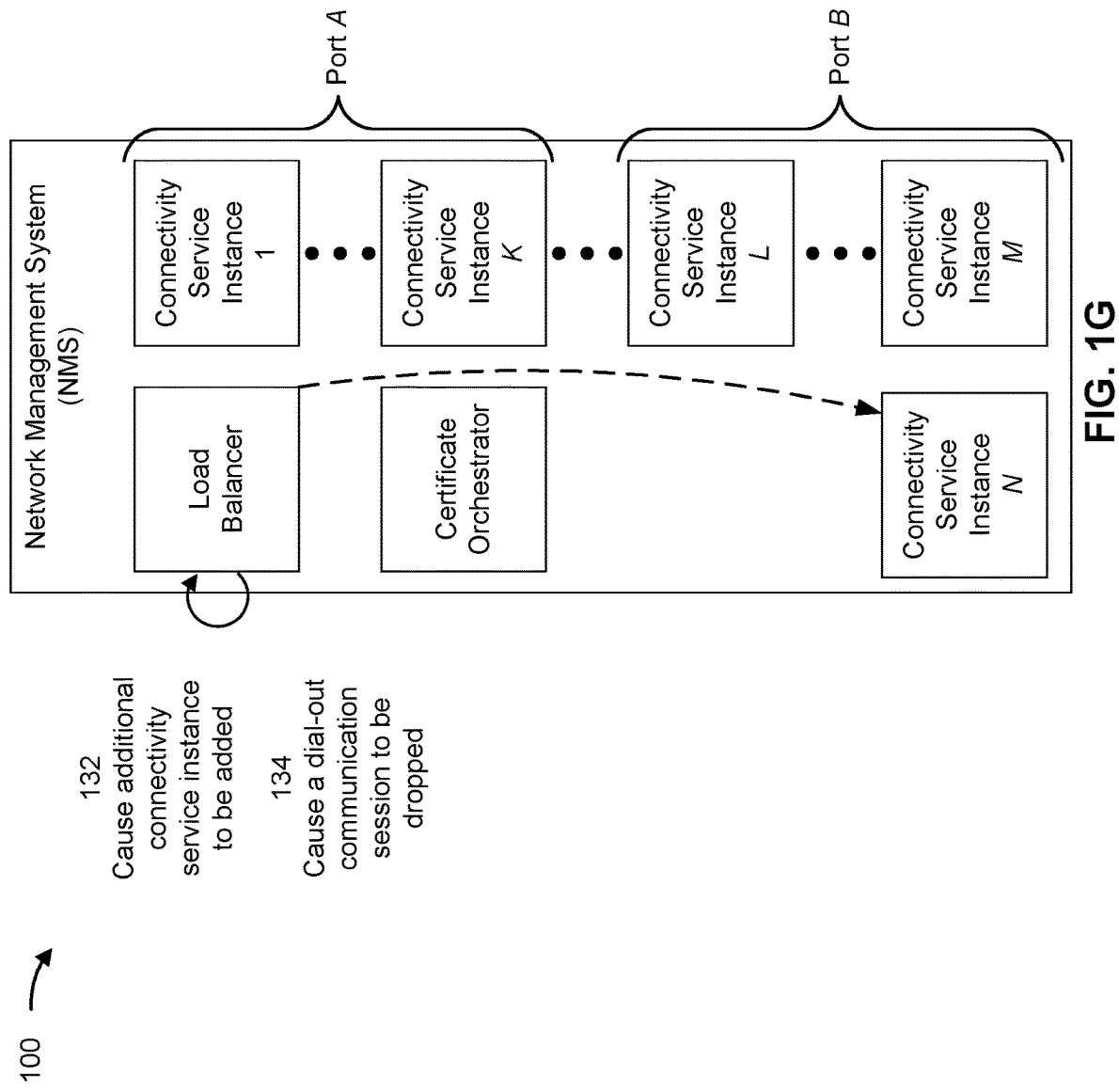

NETWORK MANAGEMENT SYSTEM FOR DIAL-OUT COMMUNICATION SESSIONS

CROSS-REFERENCE TO RELATED APPLICATION

This application claims priority to Indian Patent Application No. 202141059289, entitled "NETWORK MANAGEMENT SYSTEM FOR DIAL-OUT COMMUNICATION SESSIONS," filed on Dec. 20, 2021, the entire content of which is expressly incorporated herein by reference.

BACKGROUND

Software-as-a-service (SaaS) is a cloud service that hosts applications or services. In some cases, a multi-tenant SaaS environment may provide resources that are to be shared by different tenants (e.g., different groups of subscribers or customers) of the environment.

SUMMARY

Some implementations described herein relate to a system. The system may include one or more memories and one or more processors. The system may be configured to receive, from an endpoint device associated with a tenant of the system, activation information associated with the endpoint device. The system may be configured to determine, based on the activation information, identification information associated with the endpoint device and the tenant. The system may be configured to generate a certificate that includes the identification information. The system may be configured to send, to the endpoint device, the certificate.

Some implementations described herein relate to a non-transitory computer-readable medium that stores a set of instructions for a system. The set of instructions, when executed by one or more processors of the system, may cause the system to receive, from an endpoint device associated with a tenant of the system and as part of an attempt by the endpoint device to initiate a dial-out communication session with the system, a certificate. The set of instructions, when executed by one or more processors of the system, may cause the system to cause, based on the certificate, the dial-out communication session to be established. The set of instructions, when executed by one or more processors of the system, may cause the system to process the certificate to determine identification information associated with the endpoint device and the tenant. The set of instructions, when executed by one or more processors of the system, may cause the system to receive, from the endpoint device and via the dial-out communication session, one or more messages. The set of instructions, when executed by one or more processors of the system, may cause the system to modify the one or more messages to include the identification information. The set of instructions, when executed by one or more processors of the system, may cause the system to provide, after modification, the one or more modified messages to facilitate provisioning of services or resources associated with the system to the endpoint device.

Some implementations described herein relate to a method. The method may include identifying, by a system, a plurality of connectivity service instances of the system, where each connectivity service instance, of the plurality of connectivity service instances, supports one or more dial-out communication sessions. The method may include determining, by the system, respective instance weights of the plurality of connectivity service instances. The method may include causing, by the system, based on the respective instance weights of the plurality of connectivity service instances, one or more load balancing actions to be performed.

BRIEF DESCRIPTION OF THE DRAWINGS

FIGS. 1A-1H are diagrams of an example implementation described herein.

DETAILED DESCRIPTION

Figure 1A:
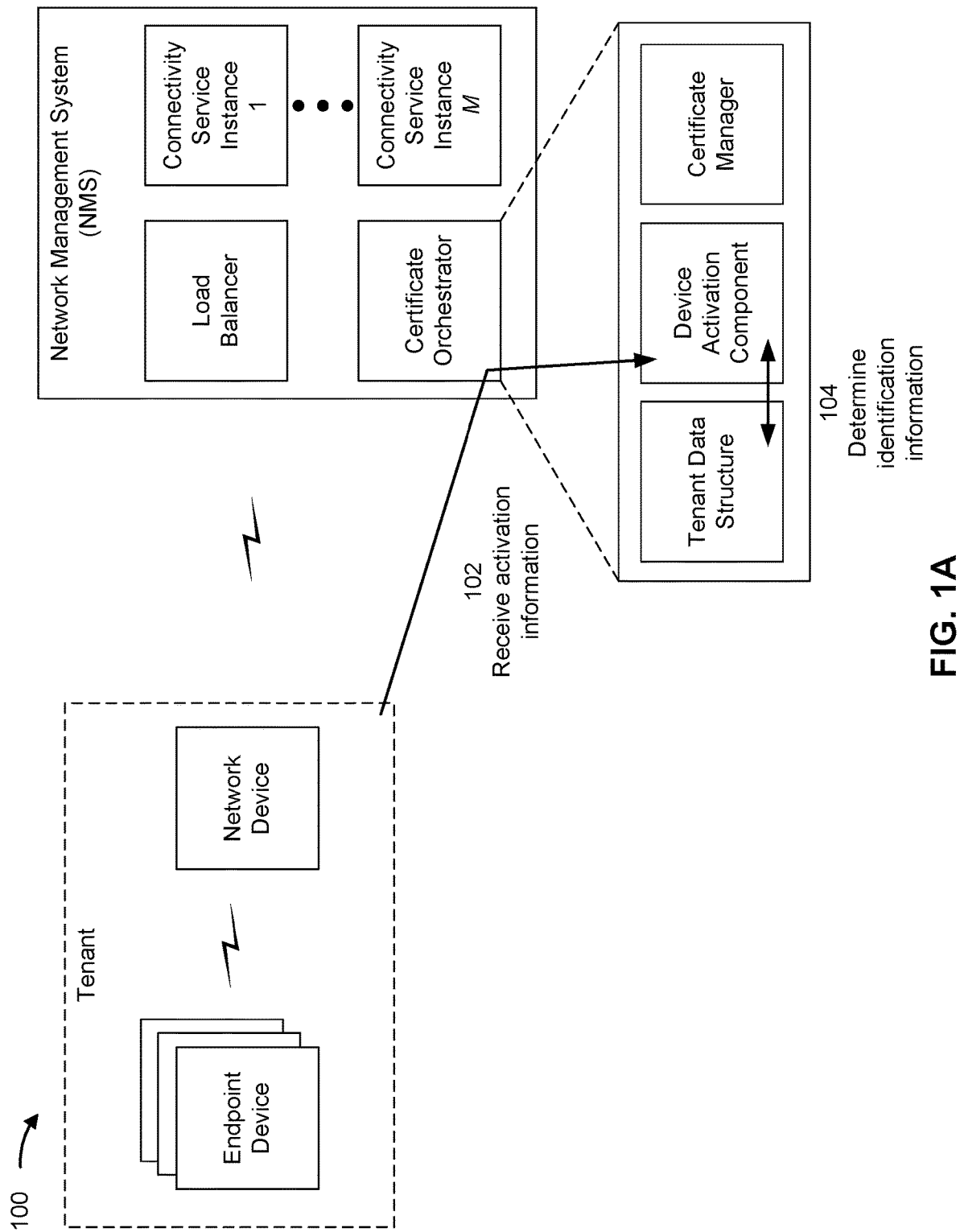

The following detailed description of example implementations refers to the accompanying drawings. The same reference numbers in different drawings may identify the same or similar elements.

A typical SaaS system (e.g., that provides security services) communicates with respective devices of tenants of a multi-tenant SaaS environment. A device of a tenant may initiate a "dial-out" communication session, such as a transport layer security (TLS) communication session, with the SaaS system (e.g., to obtain particular services and/or resources from the SaaS system). However, in many cases, establishment of a dial-out communication session does not allow for (unique) identification of the device and the tenant (or a hierarchical structure of the tenant) to the SaaS system. Consequently, in some cases, the SaaS system is not able to determine which tenant is associated with the device and therefore refrains from providing particular services and/or resources to the device via the dial-out communication session.

Further, a dial-out connectivity service instance of the SaaS system (e.g., that facilitates establishment and maintenance of the dial-out communication session) becomes overloaded when too many devices are connected to the dial-out connectivity service instance, or too much information is communicated to or from the dial-out connectivity service instance, which impacts a performance of the SaaS system. For example, computing resources (e.g., processing resources, memory resources, communication resources, and/or power resources, among other examples) of the SaaS may not be allocated and/or utilized in a balanced manner, which causes delays and/or other issues associated with providing particular services and/or resources to devices that are connected to the SaaS system via the dial-out connectivity service instance.

Some implementations described herein provide a network management system (NMS). The NMS provides a certificate to an endpoint device of a tenant that includes identification information associated with the endpoint device (e.g., an identifier associated with the endpoint device) and the tenant (e.g., one or more identifiers associated with the tenant and/or a hierarchical structure of the tenant). The endpoint device then initiates a dial-out communication session with the NMS and provides the certificate to the NMS to authenticate and validate the endpoint device. Accordingly, the NMS appends the identification information associated with the endpoint device and the tenant to messages that are transmitted by the endpoint device via the dial-out communication session. In this way, the NMS ensures that identification information associated with the endpoint device and the tenant is conveyed to upstream services, which use the information to provide particular resources and/or services associated with the tenant to the endpoint device.

In some implementations, the NMS may provide a plurality of connectivity service instances to facilitate establishment and maintenance of multiple dial-out communication sessions with multiple endpoint devices. Further, the NMS may provide load balancing of the multiple dial-out communication sessions among the plurality of connectivity service instances to ensure that one or more particular connectivity service instances do not become overloaded. In this way, a performance of the NMS is improved (e.g., as compared to a typical SaaS system). For example, because of load balancing, computing resources (e.g., processing resources, memory resources, communication resources, and/or power resources, among other examples) of the NMS are allocated and utilized in a balanced manner (e.g., across the plurality of connectivity service instances), which reduces and/or prevents delays and/or other issues associated with providing particular services and/or resources to endpoint devices that are connected to the plurality of connectivity service instances via the multiple dial-out communication sessions.

Figure 1B:
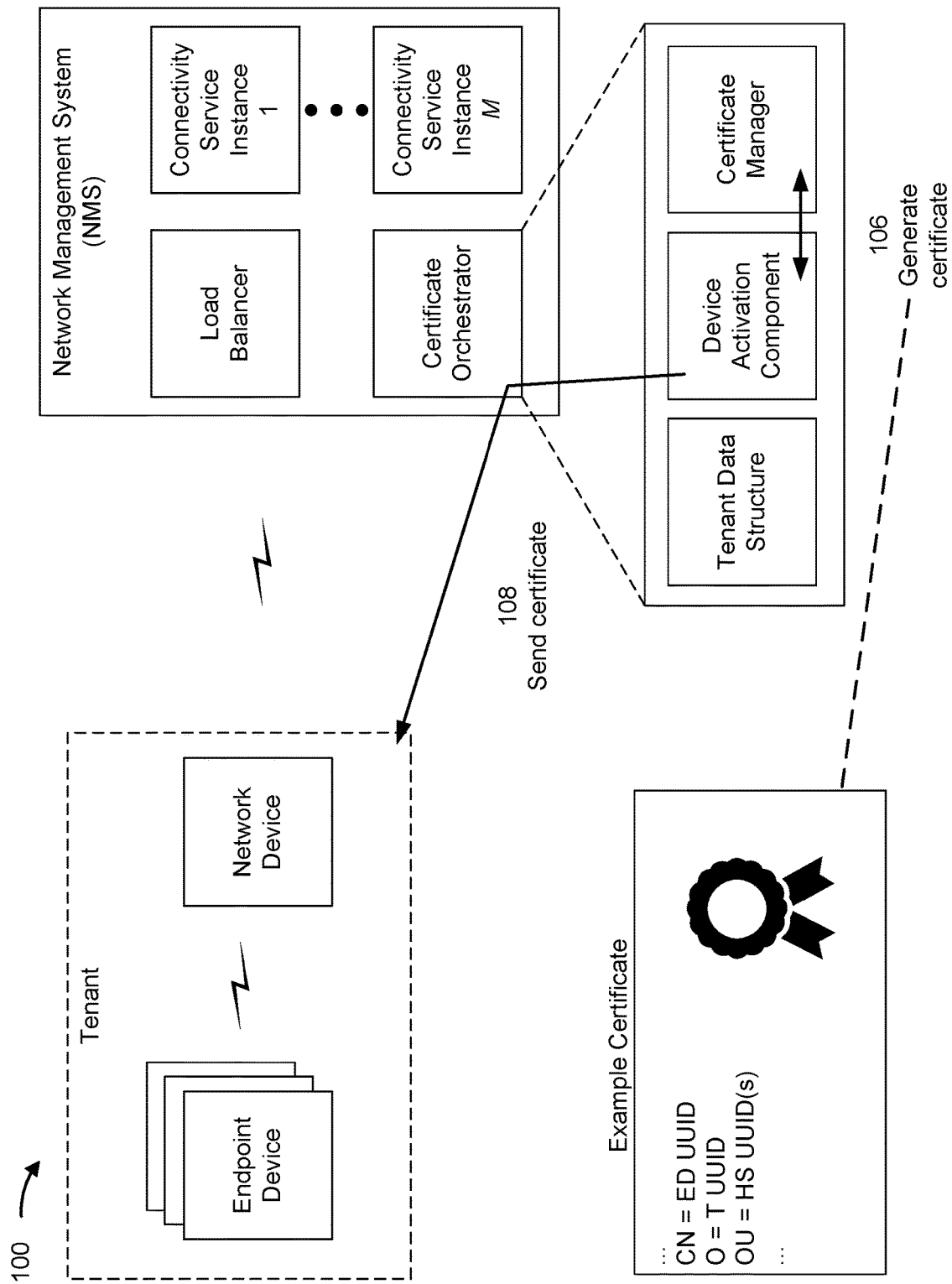

FIGS. 1A-1H are diagrams of one or more example implementations 100 described herein. Example implementation(s) 100 may include a network management system (NMS), a network device, and/or one or more endpoint devices, which are described in more detail below in connection with FIGS. 2-4. The NMS may be, for example, a multi-tenant cloud hosted network management SaaS system, and the one or more endpoint devices and the network device may be associated with a tenant of a multi-tenant SaaS environment provided by the NMS. As shown in FIGS. 1A-1G, the NMS may include a load balancer, a certificate orchestrator, and/or a plurality of connectivity service instances (shown as connectivity service instances 1 through M, where M≥2, in FIG. 1A). As shown in FIGS. 1A-1B, the certificate orchestrator may include a tenant data structure, a device activation component, and/or a certificate manager.

As shown in FIG. 1A, and by reference number 102, the NMS may receive activation information from an endpoint device of a tenant. For example, the endpoint device may activate (e.g., may turn on, may become operable, and/or may connect to the network device and therefore be able to communicate with the NMS via the network device, among other examples) and may initiate a communication session, such as a network configuration (NETCONF) protocol communication session, with the NMS. Accordingly, the endpoint device may send the activation information to the NMS (e.g., via the communication session) and, as shown in FIG. 1A, the device activation component of the certificate orchestrator of the NMS may receive the activation information. The activation information may include, for example, information identifying the endpoint device (e.g., a universally unique identifier (UUID) of the endpoint device, a medium access control (MAC) address associated with the endpoint device, and/or a device name associated with the endpoint device, among other examples) and/or information indicating that the endpoint device is to communicate with the NMS to obtain services and/or resources from the NMS (e.g., from one or more system elements associated with the NMS).

As shown in FIG. 1A, and by reference number 104, the NMS may determine identification information associated with the endpoint device and the tenant. For example, the tenant data structure may be a database, an electronic file, or another data structure that stores information that identifies associations between endpoint devices and tenants. The NMS (e.g., using the device activation component) may search the tenant data structure (e.g., based on the activation information received by the NMS from the endpoint device) to identify an entry associated with the endpoint device and may process (e.g., parse) the entry to obtain information identifying the tenant (e.g., a UUID of the tenant) and/or information identifying a hierarchical structure of the tenant (e.g., a UUID of an organization of the tenant, respective UUIDs of one or more organization units of the tenant, respective UUIDs of one or more organization subunits of the tenant, and/or so on). With respect to the hierarchal structure of the tenant, an organization of the tenant may include, for example, a managed service provider (MSP); an organization unit may include, for example, a subscriber (e.g., a company) of services and/or resources provided by the MSP; and an organization subunit may include, for example, a group within the subscriber (e.g., a division or subsidiary of the company) that is to access the services and/or resources. Accordingly, the NMS may include, in the identification information associated with the endpoint device and the tenant, the information identifying the endpoint device and at least one of the information identifying the tenant or the information identifying the hierarchical structure of the tenant.

As shown in FIG. 1B, and by reference number 106, the NMS may generate a certificate that includes the identification information associated with the endpoint device and the tenant. For example, the certificate manager of the NMS may be a certificate authority (CA) for issuing certificates (e.g., public key certificates, such as X.509 certificates, or other authentication certificates) to endpoint devices that can be used to authenticate the endpoint devices to the NMS. Accordingly, the device activation component of the NMS may provide the identification information associated with the endpoint device and the tenant to the certificate manager, which may generate the certificate to include the identification information. For example, as shown in FIG. 1B, the NMS may generate an example certificate that includes the identification information associated with the endpoint device and the tenant, such that the information identifying the endpoint device (shown as ED UUID) is included a common name (CN) field of the certificate, the information identifying the tenant (shown as T UUID) is included in an organization (O) field of the certificate, and the information identifying the hierarchical structure of the tenant (shown as HS UUID(s)) is included in an organizational unit (OU) field of the certificate. As shown by reference number 108, the NMS may send the certificate to the endpoint device. For example, the NMS (e.g., using the device activation component) may send the certificate to the endpoint device via the communication session established between the NMS and the endpoint device.

Figure 1C:
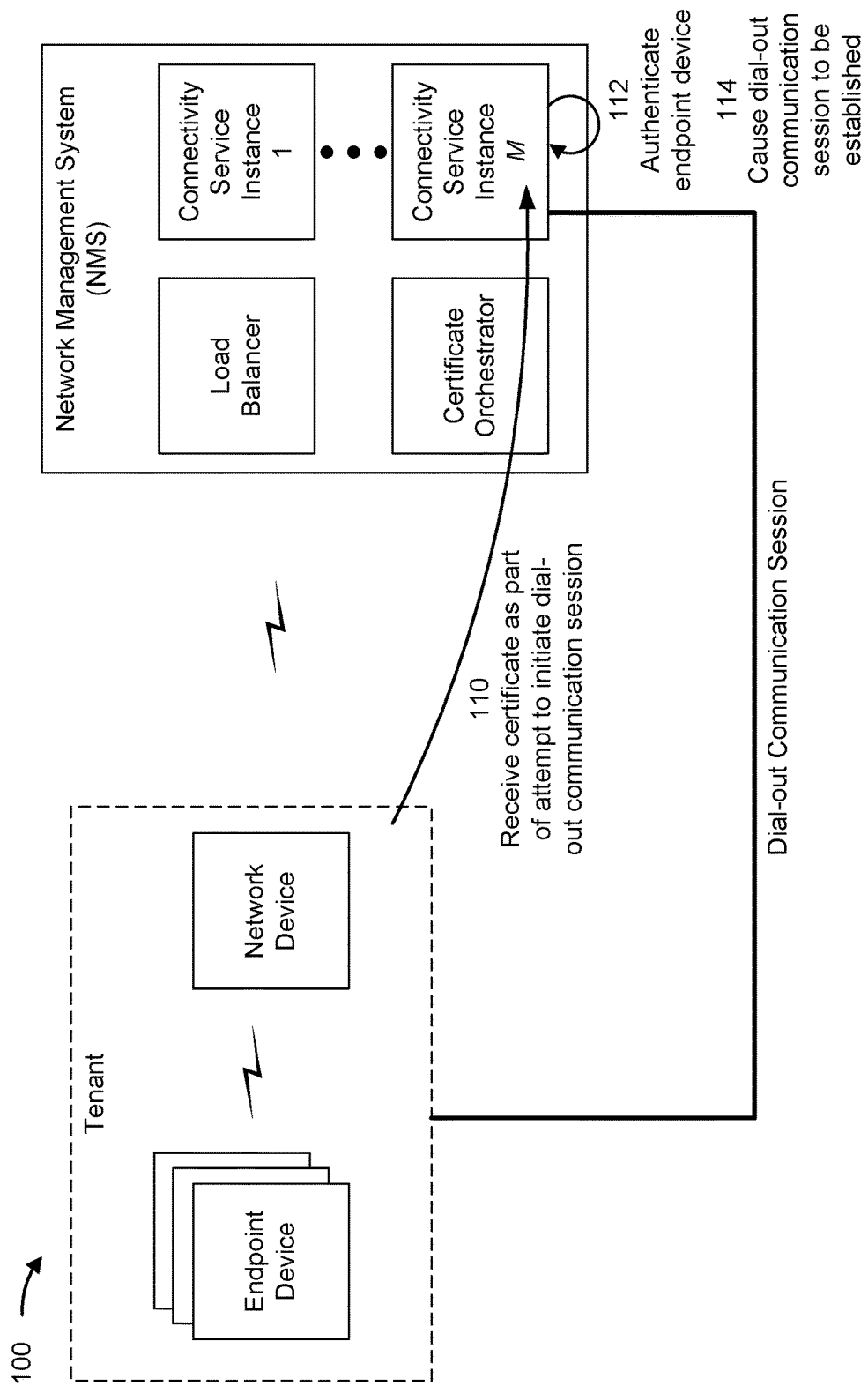

As shown in FIG. 1C, and by reference number 110, the NMS may receive the certificate from the endpoint device. For example, the endpoint device may attempt to initiate a dial-out communication session (e.g., a secure communication session, such as a transport layer security (TLS) communication session) with the NMS (e.g., to obtain services and/or resources from the NMS) and therefore may send the certificate to the NMS (e.g., as part of the attempt to initiate the dial-out communication session). In some implementations, the load balancer may select a connectivity service instance (shown as connectivity service instance M in FIG. 1C), of the plurality of connectivity service instances of the NMS, to communicate with the endpoint device to determine whether to establish the dial-out communication session and to support the dial-out communication session once established. Accordingly, the connectivity service instance may receive the certificate (e.g., as part of the attempt to initiate the dial-out communication session).

As shown by reference number 112, the NMS may authenticate the endpoint device (e.g., based on the certificate). For example, the NMS (e.g., using the connectivity service instance) may process, using a certification authentication technique, the certificate to authenticate the endpoint device (e.g., determine that the certificate manager of the certificate orchestrator of the NMS issued the certificate and/or determine that the endpoint device is approved to communicate with the NMS via a dial-out communication session). As shown by reference number 114, when the NMS successfully authenticates the certificate, the NMS (e.g., using the connectivity service instance) may cause the dial-out communication session to be established (e.g., by sending one or more dial-out communication session acceptance messages to the endpoint device) and may perform one or more other processing steps described herein in association with FIGS. 1D-1E (e.g., to support the dial-out communication session). Otherwise, the NMS may cause the dial-out communication session to not be established (e.g., by sending one or more dial-out communication session rejection messages to the endpoint device) and may not perform any other processing steps described herein in association with FIGS. 1D-1E.

Figure 1D:
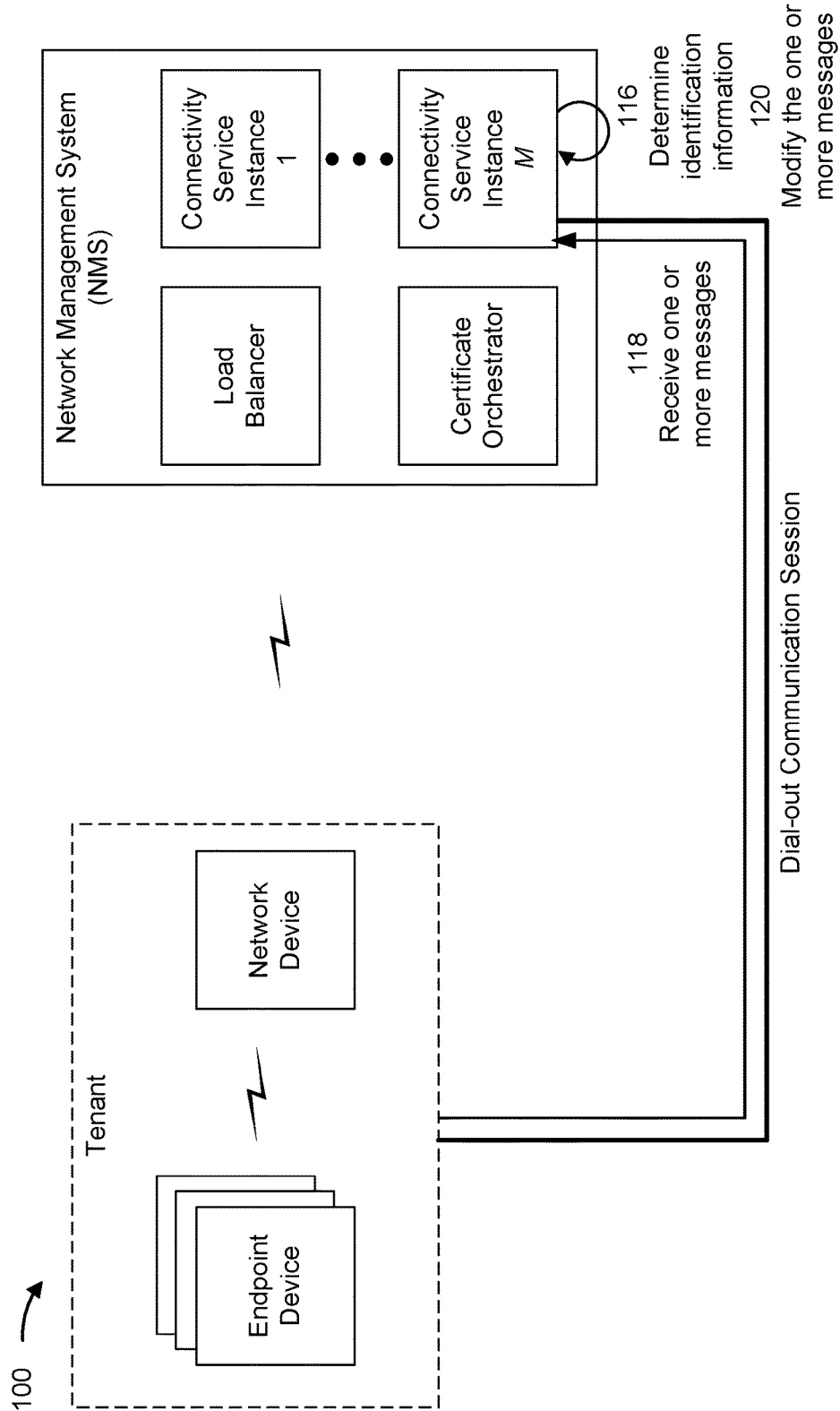

As shown in FIG. 1D, and by reference number 116, the NMS may determine the identification information associated with the endpoint device and the tenant (e.g., that is included in the certificate received from the endpoint device). For example, the NMS (e.g., using the connectivity service instance) may process (e.g., parse) the certificate to determine the identification information associated with the endpoint device and the tenant (e.g., that is included in the CN field, the O field, and/or the OU field of the example certificate shown in FIG. 1B). The NMS may use the identification information to facilitate providing services and/or resources to the endpoint device via the dial-out communication session, as further described herein.

As shown by reference number 118, the NMS may receive one or more messages from the endpoint device (e.g., via the dial-out communication session). For example, the endpoint device may send, via the dial-out communication session, the one or more messages to the NMS to obtain services and/or resources associated with the NMS and, as shown in FIG. 1D, the connectivity service instance of the NMS may receive the one or more messages. As shown by reference number 120, the NMS may modify the one or more messages. For example, the NMS (e.g., using the connectivity service instance) may modify the one or more messages to include the identification information associated with the endpoint device and the tenant (e.g., append the identification information to at least one of the one or more messages).

Figure 1E:
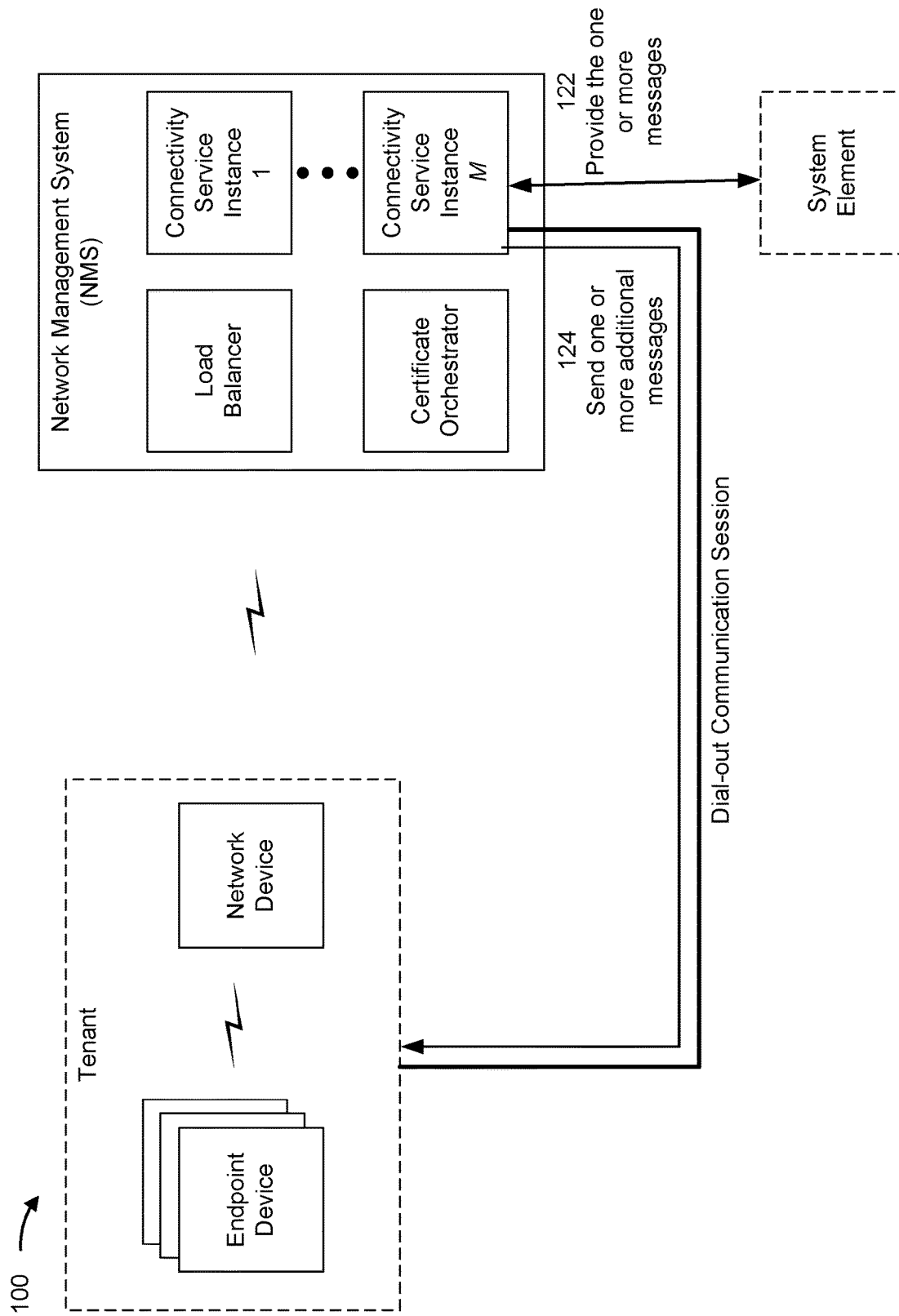

As shown in FIG. 1E and by reference number 122, the NMS may provide, after modification, the one or more modified messages to facilitate provisioning of the services and/or the resources associated with the NMS to the endpoint device. For example, the NMS (e.g., using the connectivity service instance) may provide the one or more modified messages to a system element associated with the system (e.g., included in the NMS and/or accessible to the NMS). The system element may therefore provide, based on the identification information associated with the endpoint device and the tenant included in the one or more modified messages, the services and/or resources to the endpoint device. For example, the system element may determine, based on the identification information, that the endpoint device is associated with a tenant, an organization of the tenant, an organization unit of the tenant, an organization subunit, and/or the like, that is allowed access to the services and/or resources, and may therefore provide the services and/or resources to the endpoint device. In some implementations, to provide the services and/or resources to the endpoint device, the system element may provide one or more additional messages associated with the services and/or resources to the connectivity service instance. Accordingly, as shown by reference number 124, the NMS (e.g., using the connectivity service instance) may send the one or more additional messages to the endpoint device (e.g., via the dial-out communication session) to facilitate provisioning of the services and/or resources to the endpoint device.

Figure 1F:
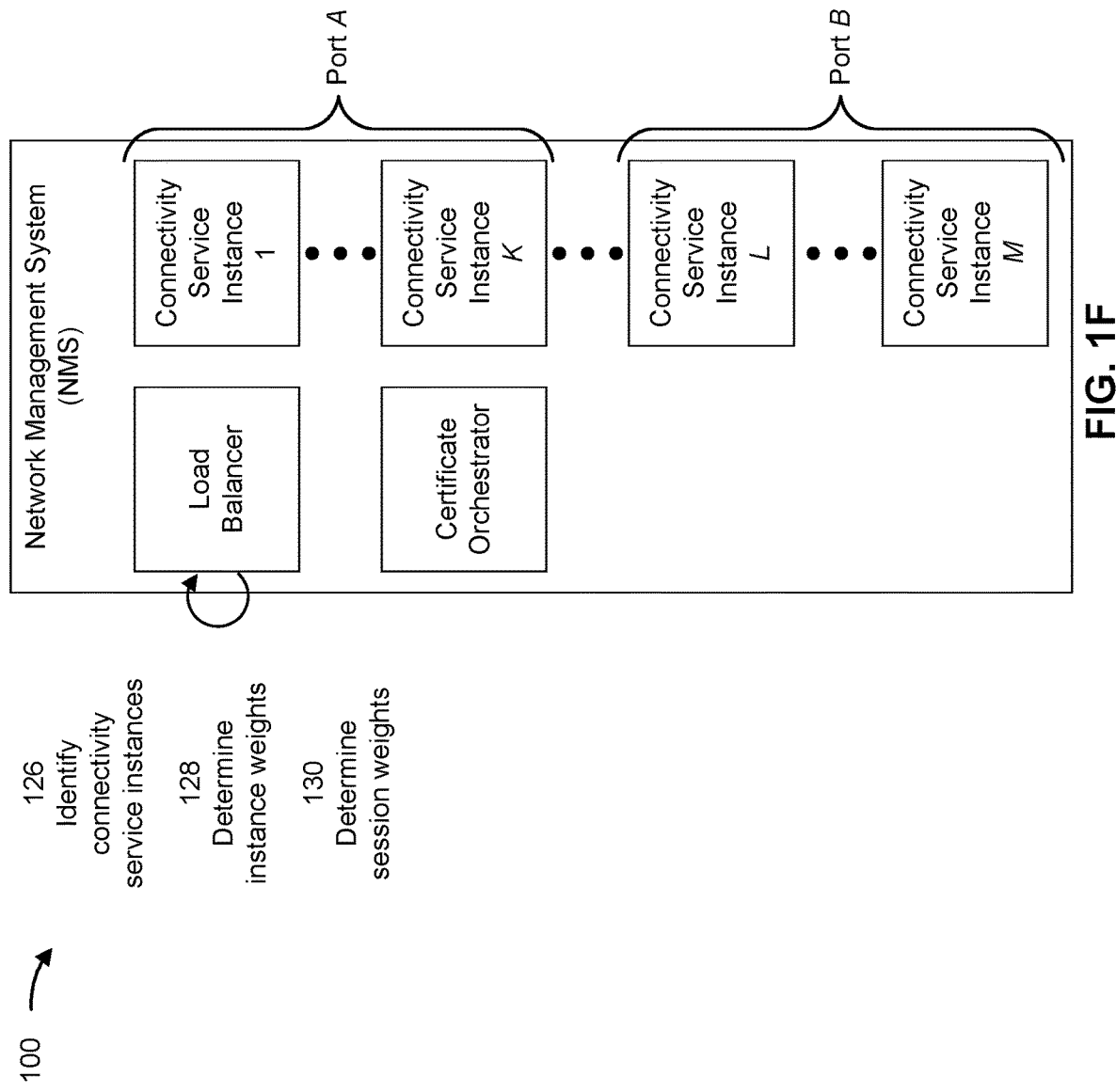

In some implementations, the NMS may have multiple ports, wherein each port is associated with a set of connectivity service instances (e.g., one or more connectivity service instances) of the plurality of connectivity service instances. For example, as shown in FIG. 1F, a first set of connectivity service instances (shown as connectivity service instances 1 through K, where $1 \leq K < M$) may be associated with a port A of the NMS, a second set of connectivity service instances (shown as connectivity service instances L through M, where $K < L \leq M$) may be associated with a port B of the NMS. Each set of connectivity service instances may be associated with a particular dial-out communication session type. For example, the first set of connectivity service instances may support dial-out communications sessions of a first type (e.g., for communicating system logs), and the second set of connectivity service instances may support dial-out communications sessions of a second type (e.g., for communicating interface telemetry information). Accordingly, each connectivity service instance type may be associated with a particular port of the NMS. For example, dial-out communications sessions of the first type may be associated with port A, and dial-out communications sessions of the second type may be associated with port B.

In some implementations, each of a set of connectivity service instances, of the plurality of connectivity service instances of the NMS, may support one or more dial-out communication sessions (e.g., that are associated with a connectivity service instance type and that are associated with a particular port of the NMS). Accordingly, as shown in FIG. 1F and by reference number 126, the NMS may identify a set of connectivity service instances (e.g., that includes more than one connectivity service instance) associated with the connectivity service instance type, such as to facilitate load balancing of dial-out communication sessions associated with the connectivity service instance type across the set of connectivity service instances. For example, the NMS (e.g., using the load balancer) may identify currently operating connectivity service instances of the NMS associated with the connectivity service instance type. Accordingly, as shown by reference number 128, the NMS may determine respective instance weights of the set of connectivity service instances (e.g., that indicate respective "processing loads" of the set of connectivity service instances). In some implementations, the NMS (e.g., using the load balancer) may determine an instance weight (e.g., that is greater than or equal to 0 and less than or equal to 1) of each connectivity service instance, of the set of connectivity service instances, based on a current processing rate (e.g., measured in events per second (EPS)) of the connectivity service instance. For example, the instance weight may be a combination of the current processing rate of the connectivity service instance and a threshold processing rate of the connectivity service instance (e.g., a maximum processing rate for providing optimal performance related to dial-out communication sessions supported by the connectivity service instance), such as the current processing rate of the connectivity service instance divided by the threshold processing rate of the connectivity service instance. The NMS (e.g., using the load balancer) may determine the instance weight of each connectivity service instance on a scheduled basis, such as at a regular interval of time that is, for example, less than or equal to every 5 minutes, every 1 hour, or every 3 hours.

In some implementations, as shown by reference number 130, the NMS may determine, for each connectivity service instance, of the set of connectivity service instances, respective session weights of the one or more dial-out communication sessions (e.g., of the connectivity service instance type) supported by the connectivity service instance (e.g., that indicate respective "session loads" of the one or more dial-out communication sessions). In some implementations, the NMS (e.g., using the load balancer) may determine a session weight (e.g., that is greater than or equal to 0 and less than or equal to 1) of each dial-out communication session that is supported by a connectivity service instance based on a current processing rate (e.g., measured in EPS) of the connectivity service instance due to the dial-out communication session. For example, the session weight may be a combination of the current processing rate of the connectivity service instance due to the dial-out communication session, a maximum processing rate of the dial-out communication session due to a representative dial-out communication session, and/or a minimum processing rate of the dial-out communication session due to the representative dial-out communication session, such as according to the following formula:

$$SW_i = (SR_i - SR_{min})/(SR_{max} - SR_{min}),$$

where $SW_i$ is a session weight of a dial-out communication session i, $SR_i$ is the current processing rate of the connectivity service instance due to the dial-out communication session i, $SR_{min}$ is the minimum processing rate of the dial-out communication session due to the representative dial-out communication session, and $SR_{max}$ is the maximum processing rate of the dial-out communication session due to the representative dial-out communication session. The NMS (e.g., using the load balancer) may determine the session weight of each dial-out communication session on a scheduled basis, such as at a regular interval of time that is, for example, less than or equal to every 5 minutes, every 1 hour, or every 3 hours.

As shown in FIG. 1G, the NMS may cause one or more load balancing actions to be performed (e.g., based on the respective instance weights of the set of connectivity service instances and/or the respective session weights of the one or more dial-out communication sessions supported by each connectivity service instance). For example, as shown by reference number 132, the NMS may cause an additional connectivity service instance (e.g., that is associated with the connectivity service instance type) to be added to the set of connectivity service instances (and thereby to the plurality of connectivity service instances). The NMS (e.g., using the load balancer) may determine that respective instance weights of at least a particular number of connectivity service instances of the set of connectivity service instances (e.g., respective instance weights of all of the connectivity service instances, a majority of the connectivity service instances, or at least a minimum number of the connectivity service instances) satisfy (e.g., are greater than or equal to) an instance weight threshold (e.g., that is greater than or equal to 0.5, 0.7, or 0.9, among other examples). Accordingly, as shown in FIG. 1G, the NMS (e.g., using the load balancer) may cause an additional connectivity service instance (shown as connectivity service instance N in FIG. 1G) to be added to the set of connectivity service instances (and thereby to the plurality of connectivity service instances). The additional connectivity service may support new dial-out communication sessions associated with the connectivity service instance type and/or dial-out communication sessions associated with the connectivity service instance type that are dropped by other connectivity service instances of the set of connectivity service instances (e.g., as further described herein in relation to reference number 134). The NMS may generate the additional connectivity service instance using a connectivity service instance deployment model (e.g., as further described herein in relation to FIG. 1H).

As another example, as shown by reference number 134, the NMS may cause a dial-out communication session supported by a connectivity service instance, of the set of connectivity service instances, to be dropped from the connectivity service instance. In some implementations, for each connectivity service instance, of the set of connectivity service instances, the NMS (e.g., using the load balancer) may determine whether the instance weight of the connectivity service instance satisfies (e.g., is greater than or equal to) an instance weight threshold (e.g., that is greater than or equal to 0.5, 0.7, or 0.9, among other examples). When the NMS (e.g., using the load balancer) determines that the instance weight of the connectivity service instance satisfies the instance weight threshold, the NMS may select a set of one or more dial-out communication sessions of the connectivity service instance and may drop the set of one or more dial-out communication sessions from the connectivity service instance. The NMS may select, for example, a set of one or more dial-out communication sessions of the connectivity service instance that have the greatest session weights (e.g., respective session weights of the set of one or more dial-out communication sessions are greater than respective session weights of other dial-out communication sessions of the connectivity service instance), or that have session weights that satisfy (e.g., are greater than or equal to) a session weight threshold (e.g., that is greater than or equal to 0.5, 0.7, or 0.9, among other examples).

Dropping the set of one or more dial-out communication sessions may cause endpoint devices associated with the set of one or more dial-out communication sessions to initiate one or more new dial-out communication sessions associated with the connectivity service instance type (e.g., with one or more other connectivity service instances of the set of connectivity service instances). For example, for each attempt by an endpoint device to initiate a new dial-out communication session associated with the connectivity service instance type, the NMS (e.g., using the load balancer) may select (e.g., using a random, or pseudo-random, selection policy) a connectivity service instance of the set of connectivity service instances (e.g., other than the connectivity service instance from which the set of one or more dial-out communication sessions were dropped). As another example, for each attempt by an endpoint device to initiate a new dial-out communication session associated with the connectivity service instance type, the NMS (e.g., using the load balancer) may select a connectivity service instance, of the set of connectivity service instances, with a least session weight (e.g., the session weight is less than or equal to respective session weights of other connectivity service instances of the set of connectivity service instances). Accordingly, the selected connectivity service instance may communicate with the endpoint device to determine whether to establish the new dial-out communication session and to support the new dial-out communication session once established (e.g., as described herein in relation to FIGS. 1C-1D).

Figure 1H:
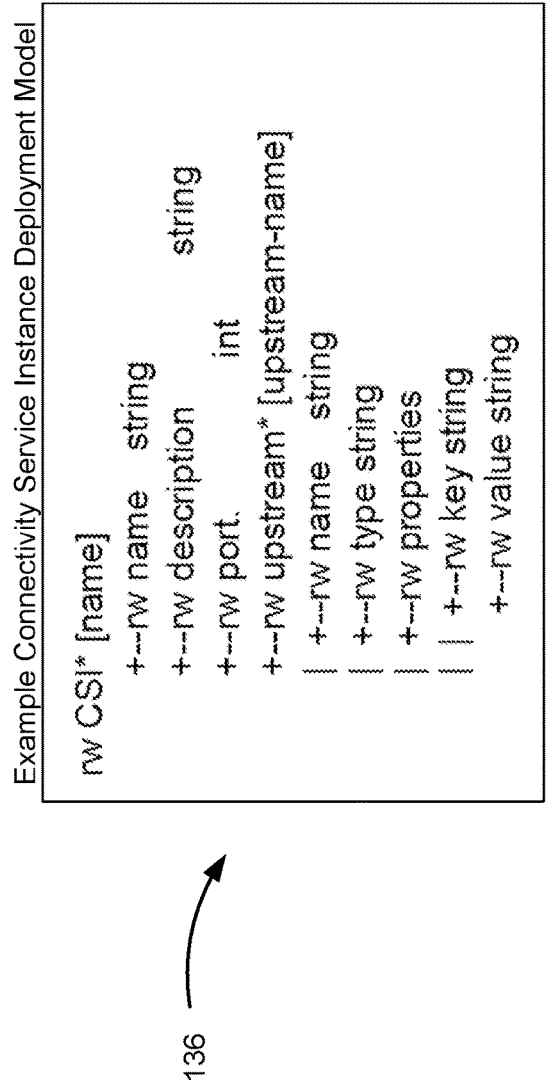

FIG. 1H shows an example connectivity service instance deployment model that may be used to add a connectivity service instance (e.g., associated with a particular connectivity service instance type) to the NMS (e.g., to populate the NMS with the plurality of connectivity service instances and/or to add an additional connectivity service instance to the NMS, such as described herein in relation to FIG. 1G and reference number 132). As shown in FIG. 1H, and by reference number 136, the example connectivity service instance deployment model may include, for a connectivity service instance to be deployed, a name field (e.g., to indicate a name of the connectivity service instance), a description field (e.g., to provide a description of the connectivity service instance), a type field (e.g., to indicate the particular connectivity service instance type), a port field (e.g., to indicate a port of the NMS on which the connectivity service instance is to communicate), an upstream field (e.g., to identify whether the connectivity service instance is to communicate with a system element that provides services and/or resources associated with the NMS), a name subfield of the upstream field (e.g., to indicate a name of the system element), a type subfield of the upstream field (e.g., to indicate a type of the system element, such as whether the system element is an orchestration system (e.g., a Kubernetes system or another orchestration system)), and/or a properties subfield of the upstream field (e.g., to indicate one or more properties, such as one or more orchestration properties, of the system element), which may be indicated by a key string subfield of the properties subfield and/or a value subfield of the properties subfield. Accordingly, the NMS (e.g., using the load balancer or another element of the NMS) may use the example connectivity service instance deployment model to deploy a connectivity service instance, as described elsewhere herein. For example, the NMS may apply the example connectivity service instance deployment model using a configuration deployment language (e.g., YAML) to deploy the connectivity service instance.

As indicated above, FIGS. 1A-1H are provided merely as one or more examples. Other examples may differ from what is described with regard to FIGS. 1A-1H.

Figure 2:
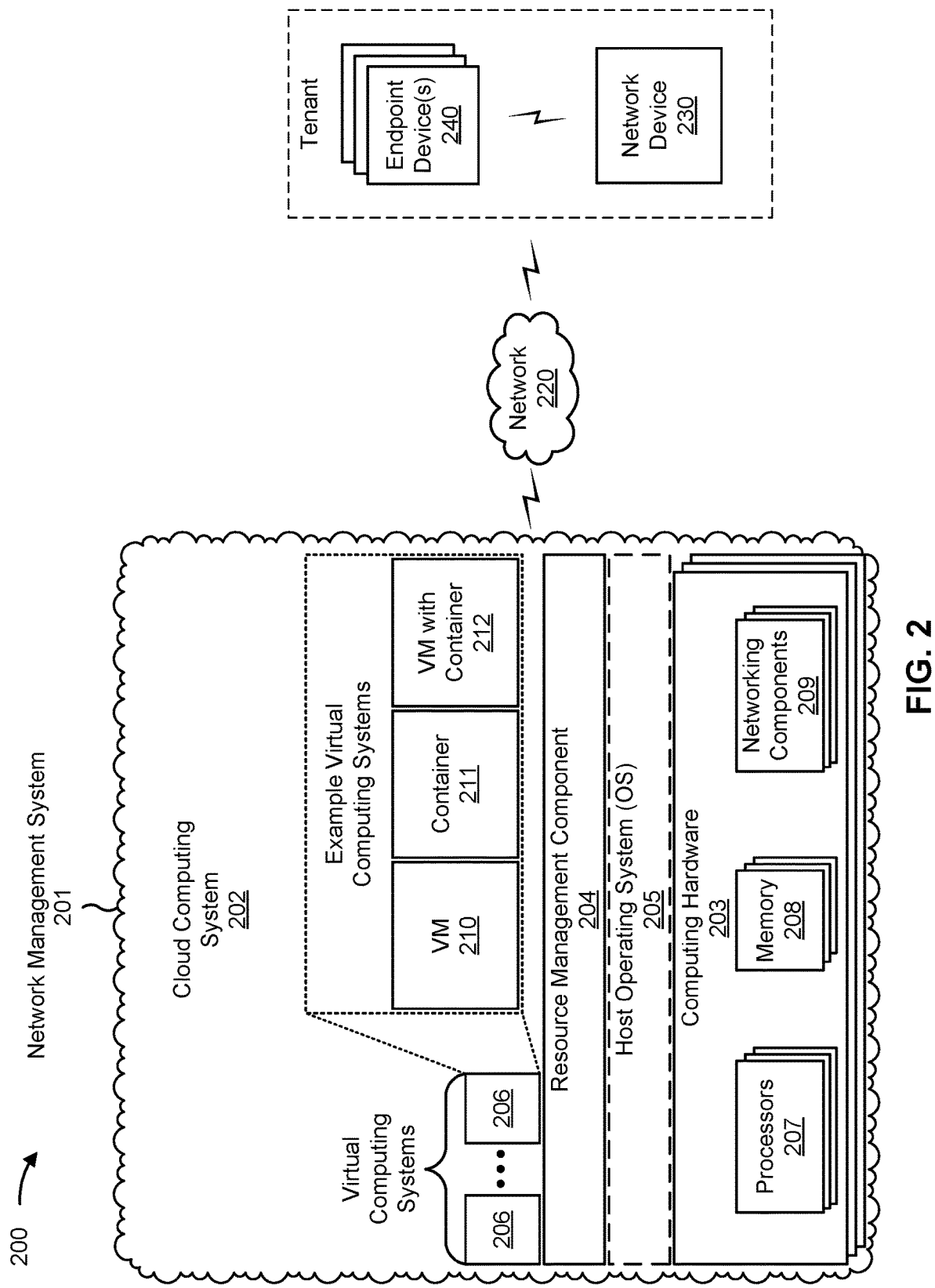
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-212, as described in more detail below. As further shown in FIG. 2, environment 200 may include a network 220, a network device 230, and/or one or more endpoint devices 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211 (e.g., that comprise one or more threads). In some implementations, the resource management component 204 executes within and/or in coordination with a host operating system 205. In some implementations, the resource management component 204 includes the load balancer, the certificate orchestrator (e.g., that includes the tenant data structure, the device activation component, and/or the certificate manager), and/or the plurality of connectivity service instances described herein in relation to FIGS. 1A-1H. In some implementations, the resource management component 204 may include the system element described herein in relation to FIGS. 1A-1H, or, alternatively, may communicate with the system element (e.g., via the network 220).

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3, which may include a standalone server or another type of computing device. The network management system 201 may perform one or more operations and/or processes described in more detail elsewhere herein. In some implementations, the event log management system may provide a multi-tenant SaaS environment to one or more tenants (e.g., where a tenant includes a network device 230 and one or more endpoint devices 240).

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Network device 230 includes one or more devices capable of receiving, processing, storing, routing, and/or providing traffic (e.g., a packet or other information or metadata) in a manner described herein. For example, network device 230 may include a router, such as a label switching router (LSR), a label edge router (LER), an ingress router, an egress router, a provider router (e.g., a provider edge router or a provider core router), a virtual router, or another type of router. Additionally, or alternatively, network device 230 may include a gateway, a switch, a firewall, a hub, a bridge, a reverse proxy, a server (e.g., a proxy server, a cloud server, or a data center server), a load balancer, and/or a similar device. In some implementations, network device 230 may be a physical device implemented within a housing, such as a chassis. In some implementations, network device 230 may be a virtual device implemented by one or more computer devices of a cloud computing environment or a data center. In some implementations, a group of network devices 230 may be a group of data center nodes that are used to route traffic flow through network 220. In some implementations, network device 230 may be associated with a tenant of the multi-tenant SaaS environment provided by the network management system 201.

Endpoint device(s) 240 includes one or more devices capable of receiving, generating, storing, processing, and/or providing information, such as information described herein. For example, endpoint device(s) 240 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device(s) 240 may receive network traffic from and/or may provide network traffic to network management system 201 and/or network device 230, via network 220. In some implementations, endpoint device(s) 240 may be associated with a tenant of the multi-tenant SaaS environment provided by the network management system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
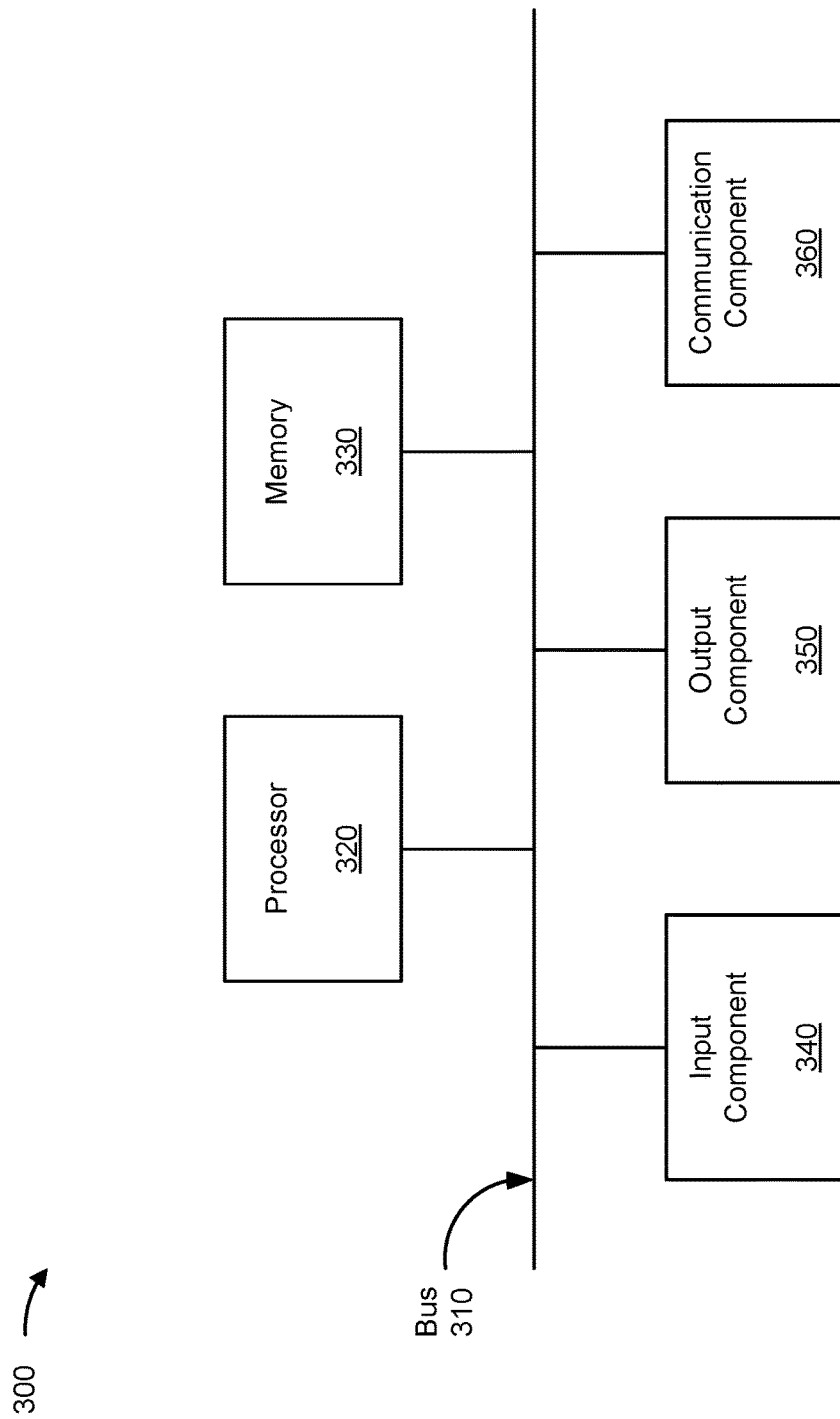
FIGS. 3-4 are diagram of example components of one or more devices of FIG. 2.

FIG. 3 is a diagram of example components of a device 300, which may correspond to network management system 201, computing hardware 203, network device 230, and/or endpoint device 240. In some implementations, network management system 201, computing hardware 203, network device 230, and/or endpoint device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
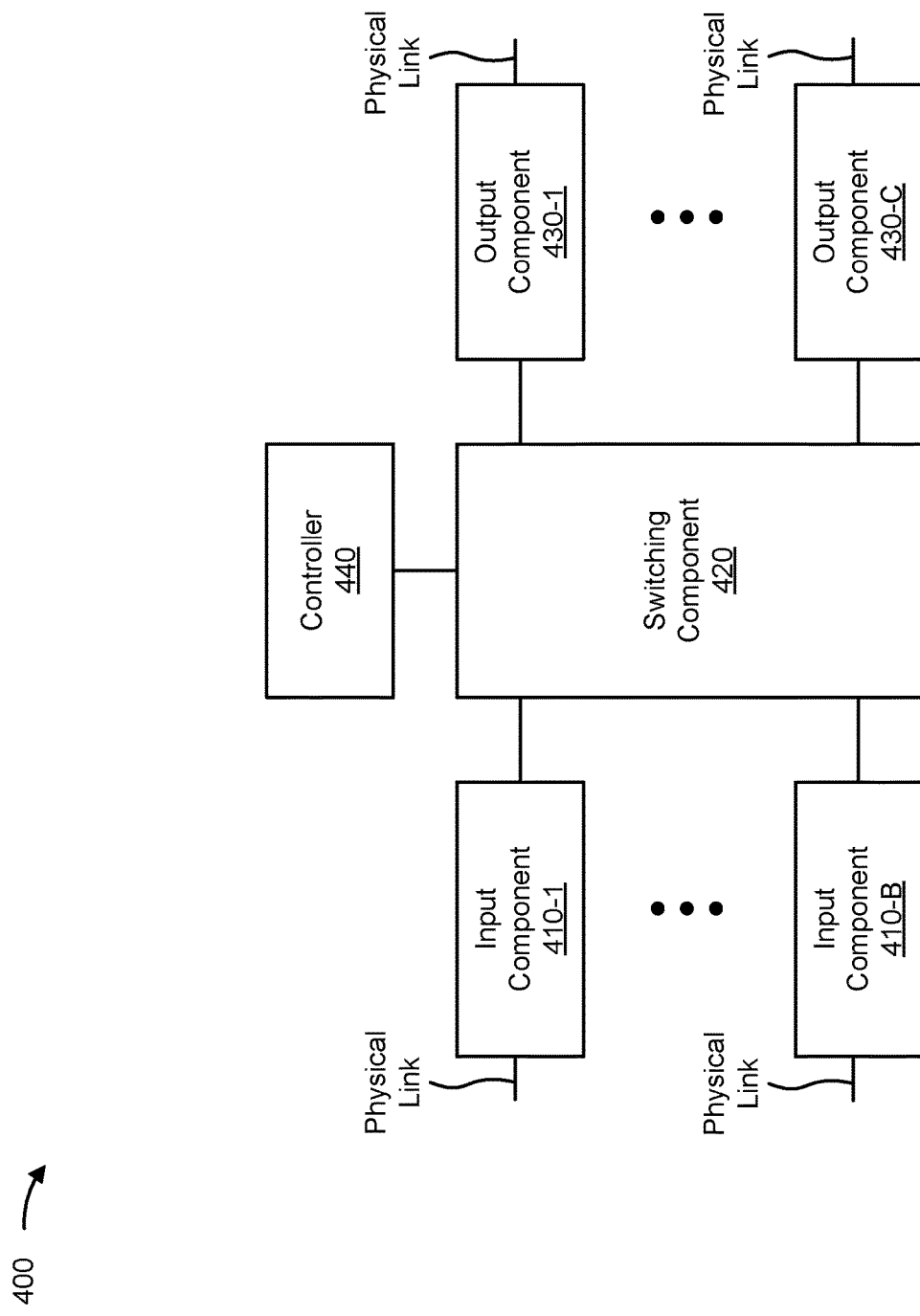

FIG. 4 is a diagram of example components of a device 400. Device 400 may correspond to network management system 201, computing hardware 203, network device 230, and/or endpoint device 240. In some implementations, network management system 201, computing hardware 203, network device 230, and/or endpoint device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
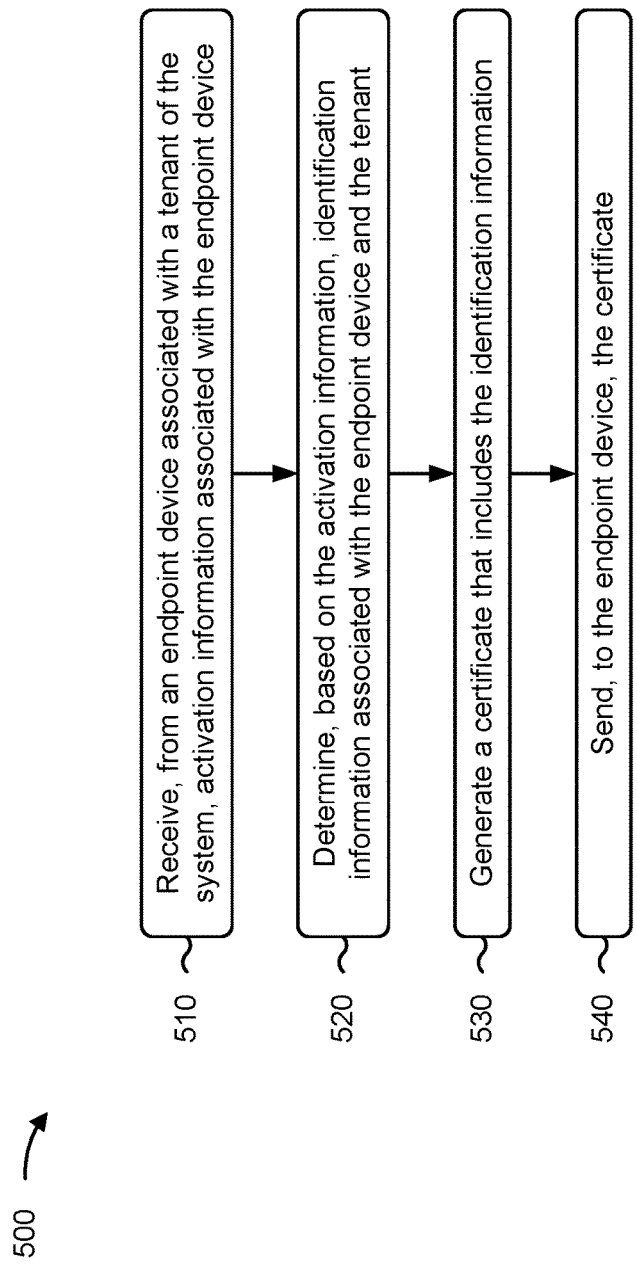
FIGS. 5-7 are flowcharts of example processes relating to management of dial-out communication sessions.

FIG. 5 is a flowchart of an example process 500 associated with management of dial-out communication sessions. In some implementations, one or more process blocks of FIG. 5 are performed by a system (e.g., event network management system 201). In some implementations, one or more process blocks of FIG. 5 are performed by another device or a group of devices separate from or including the system, such as computing hardware (e.g., computing hardware 203), a network device (e.g., network device 230), and/or an endpoint device (e.g., endpoint device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include receiving, from an endpoint device associated with a tenant of the system, activation information associated with the endpoint device (block 510). For example, the system may receive, from an endpoint device associated with a tenant of the system, activation information associated with the endpoint device, as described above.

As further shown in FIG. 5, process 500 may include determining, based on the activation information, identification information associated with the endpoint device and the tenant (block 520). For example, the system may determine, based on the activation information, identification information associated with the endpoint device and the tenant, as described above.

As further shown in FIG. 5, process 500 may include generating a certificate that includes the identification information (block 530). For example, the system may generate a certificate that includes the identification information, as described above.

As further shown in FIG. 5, process 500 may include sending, to the endpoint device, the certificate (block 540). For example, the system may send, to the endpoint device, the certificate, as described above. In some implementations, the endpoint device is to provide the certificate to the system when attempting to initiate a dial-out communication session with the system.

Process 500 may include additional implementations, such as any single implementation or any combination of implementations described below and/or in connection with one or more other processes described elsewhere herein.

In a first implementation, the identification information includes at least one of information identifying the tenant, or information identifying a hierarchical structure of the tenant.

In a second implementation, process 500 includes receiving, from the endpoint device and as part of an attempt by the endpoint device to initiate a dial-out communication session with the system, the certificate; authenticating, based on the certificate, the endpoint device; processing, based on authenticating the endpoint device, the certificate to determine the identification information; causing, based on authenticating the endpoint device, the dial-out communication session to be established; receiving, from the endpoint device and via the dial-out communication session, one or more messages; modifying the one or more messages to include the identification information; and providing, after modification, the one or more modified messages to facilitate provisioning of services or resources associated with the system to the endpoint device.

In a third implementation, process 500 includes identifying a plurality of connectivity service instances of the system that are associated with a connectivity service instance type, wherein each connectivity service instance, of the plurality of connectivity service instances, supports one or more dial-out communication sessions that are associated with the connectivity service instance type; determining respective instance weights of the plurality of connectivity service instances; and causing, based on the respective instance weights of the plurality of connectivity service instances, one or more load balancing actions to be performed.

In a fourth implementation, causing the one or more load balancing actions to be performed includes causing a dial-out communication session supported by a connectivity service instance, of the plurality of connectivity service instances, to be dropped from the connectivity service instance.

In a fifth implementation, causing the one or more load balancing actions to be performed includes determining that respective instance weights of at least a particular number of connectivity service instances, of the plurality of connectivity service instances, satisfy an instance weight threshold, and causing, based on determining that the respective instance weights of the at least a particular number of connectivity service instances satisfy the instance weight threshold, an additional connectivity service instance that is associated with the connectivity service instance type to be added to the plurality of connectivity service instances.

In a sixth implementation, causing the one or more load balancing actions to be performed includes generating, using a connectivity service instance deployment model, an additional connectivity service instance that is associated with the connectivity service instance type to be added to the plurality of connectivity service instances.

In a seventh implementation, process 500 includes identifying a plurality of connectivity service instances of the system that are associated with a connectivity service instance type, wherein each connectivity service instance, of the plurality of connectivity service instances, supports one or more dial-out communication sessions that are associated with the connectivity service instance type; determining respective instance weights of the plurality of connectivity service instances; determining, for each connectivity service instance, of the plurality of connectivity service instances, respective session weights of the one or more dial-out communication sessions supported by the connectivity service instance; and causing, based on the respective instance weights of the plurality of connectivity service instances and the respective session weights of the one or more dial out communication sessions supported by each connectivity service instance, one or more load balancing actions to be performed.

In an eighth implementation, causing the one or more load balancing actions to be performed includes determining that an instance weight of a connectivity service instance, of the plurality of connectivity service instances, satisfies an instance weight threshold; identifying, based on determining that the instance weight of the connectivity service instance satisfies the instance weight threshold, a dial-out communication session, of the one or more dial-out communication sessions supported by the connectivity service instance, with a session weight that satisfies a session weight threshold; and causing the dial-out communication session to be dropped from the connectivity service instance.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
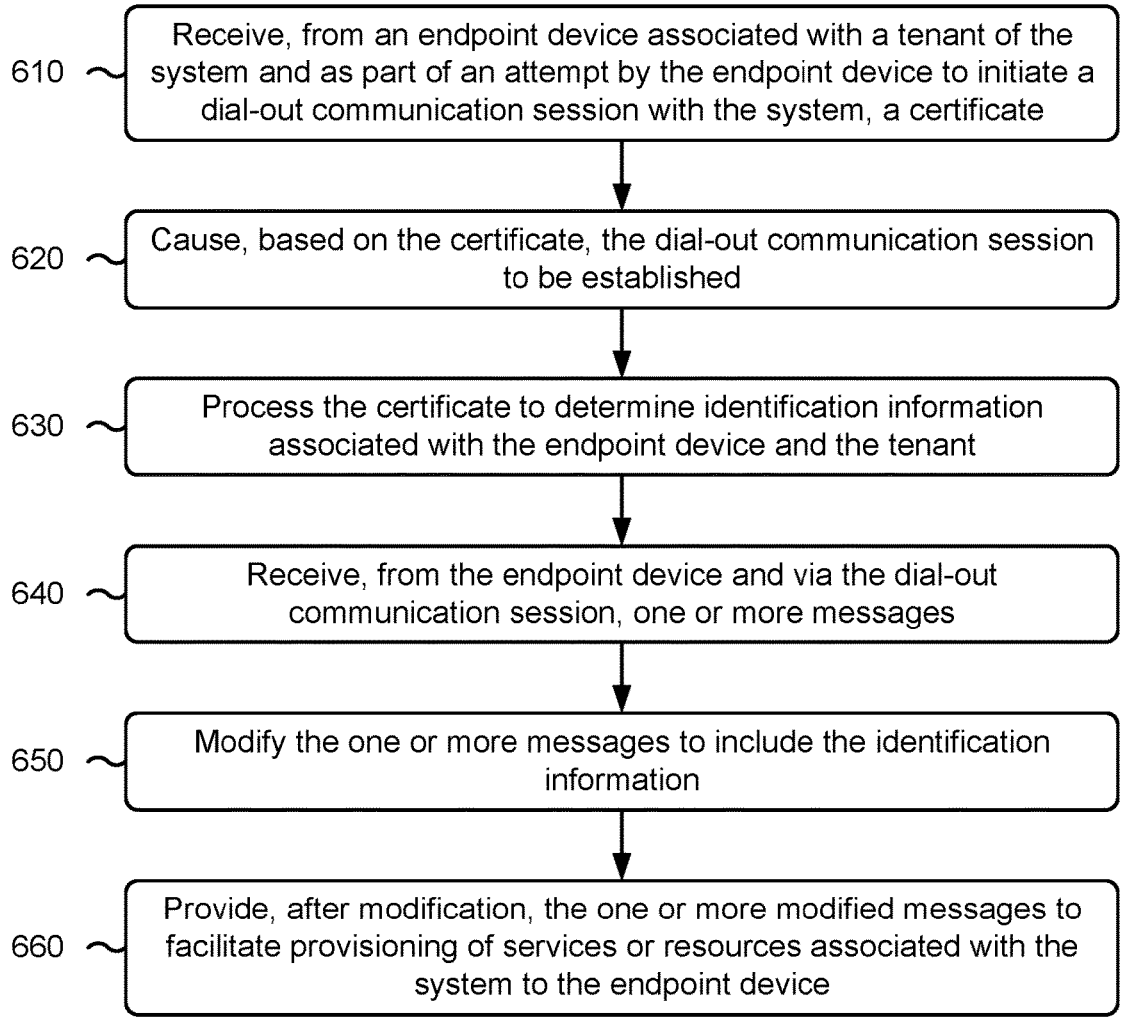

FIG. 6 is a flowchart of an example process 600 associated with management of dial-out communication sessions. In some implementations, one or more process blocks of FIG. 6 are performed by a system (e.g., event network management system 201). In some implementations, one or more process blocks of FIG. 6 are performed by another device or a group of devices separate from or including the system, such as computing hardware (e.g., computing hardware 203), a network device (e.g., network device 230), and/or an endpoint device (e.g., endpoint device 240). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 6, process 600 may include receiving, from an endpoint device associated with a tenant of the system and as part of an attempt by the endpoint device to initiate a dial-out communication session with the system, a certificate (block 610). For example, the system may receive, from an endpoint device associated with a tenant of the system and as part of an attempt by the endpoint device to initiate a dial-out communication session with the system, a certificate, as described above.

As further shown in FIG. 6, process 600 may include causing, based on the certificate, the dial-out communication session to be established (block 620). For example, the system may cause, based on the certificate, the dial-out communication session to be established, as described above.

As further shown in FIG. 6, process 600 may include processing the certificate to determine identification information associated with the endpoint device and the tenant (block 630). For example, the system may process the certificate to determine identification information associated with the endpoint device and the tenant, as described above.

As further shown in FIG. 6, process 600 may include receiving, from the endpoint device and via the dial-out communication session, one or more messages (block 640). For example, the system may receive, from the endpoint device and via the dial-out communication session, one or more messages, as described above.

As further shown in FIG. 6, process 600 may include modifying the one or more messages to include the identification information (block 650). For example, the system may modify the one or more messages to include the identification information, as described above.

As further shown in FIG. 6, process 600 may include providing, after modification, the one or more modified messages to facilitate provisioning of services or resources associated with the system to the endpoint device (block 660). For example, the system may provide, after modification, the one or more modified messages to facilitate provisioning of services or resources associated with the system to the endpoint device, as described above.

Process 600 may include additional implementations, such as any single implementation or any combination of implementations described below and/or in connection with one or more other processes described elsewhere herein.

In a first implementation, process 600 includes receiving, from the endpoint device and before receiving the certificate, activation information associated with the endpoint device; determining, based on the activation information, identification information associated with the endpoint device and the tenant; generating the certificate to include the identification information; and sending, to the endpoint device, the certificate.

In a second implementation, process 600 includes identifying a plurality of connectivity service instances of the system that are associated with a connectivity service instance type, wherein each connectivity service instance, of the plurality of connectivity service instances, supports one or more dial-out communication sessions that are associated with the connectivity service instance type; determining respective instance weights of the plurality of connectivity service instances; and causing, based on the respective instance weights of the plurality of connectivity service instances, one or more load balancing actions to be performed.

In a third implementation, causing the one or more load balancing actions to be performed includes at least one of causing a dial-out communication session supported by a connectivity service instance, of the plurality of connectivity service instances, to be dropped from the connectivity service instance, or causing an additional connectivity service instance that is associated with the connectivity service instance type to be added to the plurality of connectivity service instances.

In a fourth implementation, causing the one or more load balancing actions to be performed includes at least one of determining, for each connectivity service instance, of the plurality of connectivity service instances, respective session weights of the one or more dial-out communication sessions supported by the connectivity service instance, and causing, based on the respective instance weights of the plurality of connectivity service instances and the respective session weights of the one or more dial out communication sessions supported by each connectivity service instance, the one or more load balancing actions to be performed.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
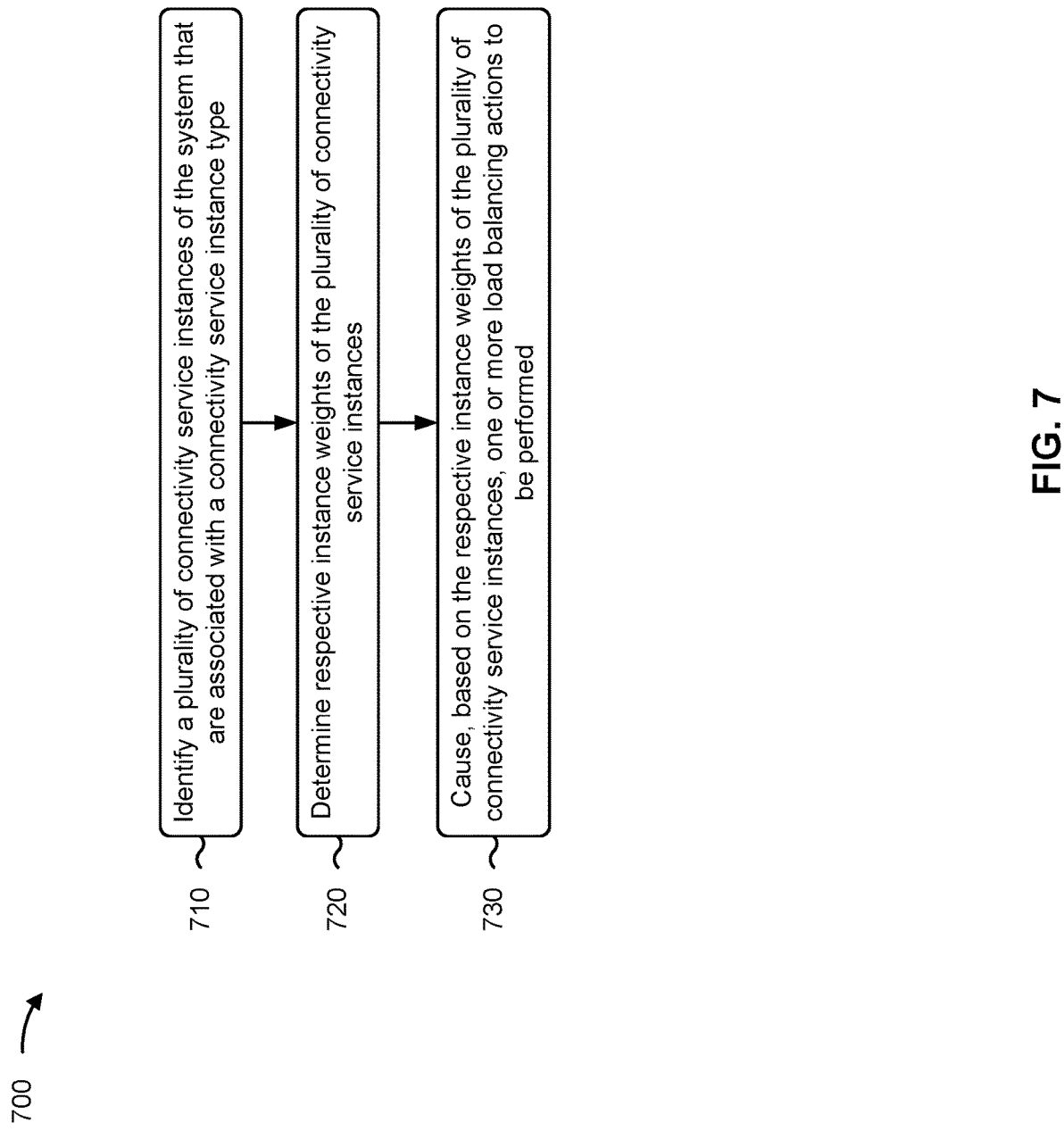

FIG. 7 is a flowchart of an example process 700 associated with management of dial-out communication sessions. In some implementations, one or more process blocks of FIG. 7 are performed by a system (e.g., event network management system 201). In some implementations, one or more process blocks of FIG. 7 are performed by another device or a group of devices separate from or including the system, such as computing hardware (e.g., computing hardware 203), a network device (e.g., network device 230), and/or an endpoint device (e.g., endpoint device 240). Additionally, or alternatively, one or more process blocks of FIG. 7 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 7, process 700 may include identifying a plurality of connectivity service instances of the system that are associated with a connectivity service instance type (block 710). For example, the system may identify a plurality of connectivity service instances of the system that are associated with a connectivity service instance type, as described above. In some implementations, each connectivity service instance, of the plurality of connectivity service instances, supports one or more dial-out communication sessions that are associated with the connectivity service instance type.

As further shown in FIG. 7, process 700 may include determining respective instance weights of the plurality of connectivity service instances (block 720). For example, the system may determine respective instance weights of the plurality of connectivity service instances, as described above.

As further shown in FIG. 7, process 700 may include causing, based on the respective instance weights of the plurality of connectivity service instances, one or more load balancing actions to be performed (block 730). For example, the system may cause, based on the respective instance weights of the plurality of connectivity service instances, one or more load balancing actions to be performed, as described above.

Process 700 may include additional implementations, such as any single implementation or any combination of implementations described below and/or in connection with one or more other processes described elsewhere herein.

In a first implementation, causing the one or more load balancing actions to be performed comprises determining that respective instance weights of at least a particular number of connectivity service instances, of the plurality of connectivity service instances, satisfy an instance weight threshold, and causing, based on determining that the respective instance weights of the at least a particular number of connectivity service instances satisfy the instance weight threshold, an additional connectivity service instance that is associated with the connectivity service instance type to be added to the plurality of connectivity service instances.

In a second implementation, causing the one or more load balancing actions to be performed comprises generating, using a connectivity service instance deployment model, an additional connectivity service instance that is associated with the connectivity service instance type to be added to the plurality of connectivity service instances.

In a third implementation, causing the one or more load balancing actions to be performed comprises determining, for each connectivity service instance, of the plurality of connectivity service instances, respective session weights of the one or more dial-out communication sessions supported by the connectivity service instance; determining that an instance weight of a connectivity service instance, of the plurality of connectivity service instances, satisfies an instance weight threshold; identifying, based on determining that the instance weight of the connectivity service instance satisfies the instance weight threshold, a dial-out communication session, of the one or more dial-out communication sessions supported by the connectivity service instance, with a session weight that satisfies a session weight threshold; and causing the dial-out communication session to be dropped from the connectivity service instance.

In a fourth implementation, process 700 includes receiving, from an endpoint device associated with a tenant of the system, activation information associated with the endpoint device; determining, based on the activation information, identification information associated with the endpoint device and the tenant; generating a certificate that includes the identification information; and sending, to the endpoint device, the certificate, wherein the endpoint device is to provide the certificate to the system when attempting to initiate a dial-out communication session with the system.

In a fifth implementation, process 700 includes receiving, from an endpoint device associated with a tenant of the system and as part of an attempt by the endpoint device to initiate a dial-out communication session with the system, a certificate; causing, based on the certificate, the dial-out communication session to be established and to be supported by a particular connectivity service instance of the plurality of connectivity service instances; processing the certificate to determine identification information associated with the endpoint device and the tenant; receiving, from the endpoint device and via the dial-out communication session, one or more messages; modifying the one or more messages to include the identification information; and providing, after modification, the one or more modified messages to facilitate provisioning of services or resources associated with the system to the endpoint device.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memories; and
one or more processors to:
receive, from an endpoint device associated with a tenant of the system, activation information associated with the endpoint device;
determine, based on the activation information, identification information associated with the endpoint device and the tenant,
wherein the identification information associated with a hierarchical structure of the tenant;
generate a certificate that includes the identification information; and
send, to the endpoint device, the certificate,
wherein the endpoint device is to provide the certificate to the system when attempting to initiate a dial-out communication session with the system.

2. The system of claim 1, wherein the identification information further includes:
information identifying the tenant.

3. The system of claim 1, wherein the one or more processors are further to:
receive, from the endpoint device and as part of an attempt by the endpoint device to initiate a dial-out communication session with the system, the certificate;
authenticate, based on the certificate, the endpoint device;
process, based on authenticating the endpoint device, the certificate to determine the identification information;
cause, based on authenticating the endpoint device, the dial-out communication session to be established;
receive, from the endpoint device and via the dial-out communication session, one or more messages;
modify the one or more messages to include the identification information; and
provide, after modification, the one or more modified messages to facilitate provisioning of services or resources associated with the system to the endpoint device.

4. The system of claim 1, wherein the one or more processors are further to:
identify a plurality of connectivity service instances of the system that are associated with a connectivity service instance type,
wherein each connectivity service instance, of the plurality of connectivity service instances, supports one or more dial-out communication sessions that are associated with the connectivity service instance type;
determine respective instance weights of the plurality of connectivity service instances; and cause, based on the respective instance weights of the plurality of connectivity service instances, one or more load balancing actions to be performed.

5. The system of claim 4, wherein the one or more processors, to cause the one or more load balancing actions to be performed, are to:
cause a dial-out communication session supported by a connectivity service instance, of the plurality of connectivity service instances, to be dropped from the connectivity service instance.

6. The system of claim 4, wherein the one or more processors, to cause the one or more load balancing actions to be performed, are to:
determine that respective instance weights of at least a particular number of connectivity service instances, of the plurality of connectivity service instances, satisfy an instance weight threshold; and
cause, based on determining that the respective instance weights of the at least a particular number of connectivity service instances satisfy the instance weight threshold, an additional connectivity service instance that is associated with the connectivity service instance type to be added to the plurality of connectivity service instances.

7. The system of claim 4, wherein the one or more processors, to cause the one or more load balancing actions to be performed, are to:
generate, using a connectivity service instance deployment model, an additional connectivity service instance that is associated with the connectivity service instance type to be added to the plurality of connectivity service instances.

8. The system of claim 1, wherein the one or more processors are further to:
identify a plurality of connectivity service instances of the system that are associated with a connectivity service instance type,
wherein each connectivity service instance, of the plurality of connectivity service instances, supports one or more dial-out communication sessions that are associated with the connectivity service instance type;
determine respective instance weights of the plurality of connectivity service instances;
determine, for each connectivity service instance, of the plurality of connectivity service instances, respective session weights of the one or more dial-out communication sessions supported by the connectivity service instance; and
cause, based on the respective instance weights of the plurality of connectivity service instances and the respective session weights of the one or more dial out communication sessions supported by each connectivity service instance, one or more load balancing actions to be performed.

9. The system of claim 8, wherein the one or more processors, to cause the one or more load balancing actions to be performed, are to:
determine that an instance weight of a connectivity service instance, of the plurality of connectivity service instances, satisfies an instance weight threshold;
identify, based on determining that the instance weight of the connectivity service instance satisfies the instance weight threshold, a dial-out communication session, of the one or more dial-out communication sessions supported by the connectivity service instance, with a session weight that satisfies a session weight threshold; and cause the dial-out communication session to be dropped from the connectivity service instance.

10. A non-transitory computer-readable medium storing a set of instructions, the set of instructions comprising:
one or more instructions that, when executed by one or more processors of a system, cause the system to:
receive, from an endpoint device associated with a tenant of the system and as part of an attempt by the endpoint device to initiate a dial-out communication session with the system, a certificate,
wherein the certificate includes information associated with a hierarchical structure of the tenant;
cause, based on the certificate, the dial-out communication session to be established;
process the certificate to determine identification information associated with the endpoint device and the tenant;
receive, from the endpoint device and via the dial-out communication session, one or more messages;
modify the one or more messages to include the identification information; and
provide, after modification, the one or more modified messages to facilitate provisioning of services or resources associated with the system to the endpoint device.

11. The non-transitory computer-readable medium of claim 10, wherein the one or more instructions further cause the system to:
receive, from the endpoint device and before receiving the certificate, activation information associated with the endpoint device;
determine, based on the activation information, identification information associated with the endpoint device and the tenant;
generate the certificate to include the identification information; and
send, to the endpoint device, the certificate.

12. The non-transitory computer-readable medium of claim 10, wherein the one or more instructions further cause the system to:
identify a plurality of connectivity service instances of the system that are associated with a connectivity service instance type,
wherein each connectivity service instance, of the plurality of connectivity service instances, supports one or more dial-out communication sessions that are associated with the connectivity service instance type;
determine respective instance weights of the plurality of connectivity service instances; and
cause, based on the respective instance weights of the plurality of connectivity service instances, one or more load balancing actions to be performed.

13. The non-transitory computer-readable medium of claim 12, wherein the one or more processors, to cause the one or more load balancing actions to be performed, are to at least one of:
cause a dial-out communication session supported by a connectivity service instance, of the plurality of connectivity service instances, to be dropped from the connectivity service instance; or cause an additional connectivity service instance that is associated with the connectivity service instance type to be added to the plurality of connectivity service instances.

14. The non-transitory computer-readable medium of claim 12, wherein the one or more processors, to cause the one or more load balancing actions to be performed, are to at least one of:
determine, for each connectivity service instance, of the plurality of connectivity service instances, respective session weights of the one or more dial-out communication sessions supported by the connectivity service instance; and
cause, based on the respective instance weights of the plurality of connectivity service instances and the respective session weights of the one or more dial out communication sessions supported by each connectivity service instance, the one or more load balancing actions to be performed.

15. A method, comprising:
identifying, by a system, a plurality of connectivity service instances of the system that are associated with a connectivity service instance type,
wherein each connectivity service instance, of the plurality of connectivity service instances, supports one or more dial-out communication sessions that are associated with the connectivity service instance type;
determining, by the system, respective instance weights of the plurality of connectivity service instances,
wherein determining the respective instance weights of the plurality of connectivity service instances is based on respective current processing rates of the plurality of connectivity service instances due to the one or more dial-out communication sessions and a maximum or minimum processing rate of a particular dial-out communication session of the one or more dial-out communication sessions; and
causing, by the system, based on the respective instance weights of the plurality of connectivity service instances, one or more load balancing actions to be performed.

16. The method of claim 15, wherein causing the one or more load balancing actions to be performed comprises:
determining that respective instance weights of at least a particular number of connectivity service instances, of the plurality of connectivity service instances, satisfy an instance weight threshold; and
causing, based on determining that the respective instance weights of the at least a particular number of connectivity service instances satisfy the instance weight threshold, an additional connectivity service instance that is associated with the connectivity service instance type to be added to the plurality of connectivity service instances.

17. The method of claim 15, wherein causing the one or more load balancing actions to be performed comprises:
generating, using a connectivity service instance deployment model, an additional connectivity service instance that is associated with the connectivity service instance type to be added to the plurality of connectivity service instances.

18. The method of claim 15, wherein causing the one or more load balancing actions to be performed comprises:
determining, for each connectivity service instance, of the plurality of connectivity service instances, respective session weights of the one or more dial-out communication sessions supported by the connectivity service instance;

determining that an instance weight of a connectivity service instance, of the plurality of connectivity service instances, satisfies an instance weight threshold;

identifying, based on determining that the instance weight of the connectivity service instance satisfies the instance weight threshold, a dial-out communication session, of the one or more dial-out communication sessions supported by the connectivity service instance, with a session weight that satisfies a session weight threshold; and causing the dial-out communication session to be dropped from the connectivity service instance.

19. The method of claim 15, further comprising:

receiving, from an endpoint device associated with a tenant of the system, activation information associated with the endpoint device;

determining, based on the activation information, identification information associated with the endpoint device and the tenant;

generating a certificate that includes the identification information; and sending, to the endpoint device, the certificate, wherein the endpoint device is to provide the certificate to the system when attempting to initiate a dial-out communication session with the system.

20. The method of claim 15, further comprising:

receiving, from an endpoint device associated with a tenant of the system and as part of an attempt by the endpoint device to initiate a dial-out communication session with the system, a certificate;

causing, based on the certificate, the dial-out communication session to be established and to be supported by a particular connectivity service instance of the plurality of connectivity service instances;

processing the certificate to determine identification information associated with the endpoint device and the tenant;

receiving, from the endpoint device and via the dial-out communication session, one or more messages;

modifying the one or more messages to include the identification information; and providing, after modification, the one or more modified messages to facilitate provisioning of services or resources associated with the system to the endpoint device.

* * * * *